US008447817B2

(12) United States Patent
Lavoie et al.

(10) Patent No.: US 8,447,817 B2
(45) Date of Patent: May 21, 2013

(54) ASSOCIATING MULTIPLE PHYSICAL MAILBOXES WITH SAME USER OBJECT IN MESSAGING SYSTEM

(75) Inventors: Lauren B. Lavoie, Seattle, WA (US);
Karim M. Batthish, Seattle, WA (US);
Sidney Lee Taylor, Roswell, GA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 12/389,380

(22) Filed: Feb. 20, 2009

(65) Prior Publication Data

US 2010/0217805 A1     Aug. 26, 2010

(51) Int. Cl.
*G06F 15/173* (2006.01)

(52) U.S. Cl.
USPC ............ 709/206; 709/227; 707/796; 715/752

(58) Field of Classification Search
None
See application file for complete search history.

(56) References Cited

U.S. PATENT DOCUMENTS

| | | | |
|---|---|---|---|
| 4,837,798 A | 6/1989 | Cohen et al. | |
| 6,732,368 B1 | 5/2004 | Michael et al. | |
| 6,999,993 B1* | 2/2006 | Shah et al. | 709/207 |
| 7,266,586 B2 | 9/2007 | Lincke et al. | |
| 7,689,656 B2* | 3/2010 | McCarthy et al. | 709/206 |
| 7,761,429 B2* | 7/2010 | Polimeni | 707/668 |
| 8,020,105 B1* | 9/2011 | Lemay et al. | 715/746 |
| 2003/0123622 A1 | 7/2003 | Gifford et al. | |
| 2003/0231207 A1* | 12/2003 | Huang | 345/752 |
| 2006/0101064 A1* | 5/2006 | Strong et al. | 707/102 |
| 2007/0100856 A1* | 5/2007 | Ebbesen | 707/101 |
| 2008/0037583 A1* | 2/2008 | Dawes et al. | 370/467 |

OTHER PUBLICATIONS

"6 Online Email Aggregators that Do More Than Just Aggregate", P. Ningthoujam, Aug. 18, 2008, pp. 1-4.*
"Email Aggregation Launches on AOL.com", TimeWarner Press Release, Sep. 10, 2008, p. 1.*
"RFC 4978: The IMAP COMPRESS Extension", Aug. 2007, IETF, pp. 1-10.*
"Features of Exchange Server 2007", retrieved at <<http://www.microsoft.com/exchange/evaluation/features/default.mspx>>, Jun. 11, 2006.
"Exchange Unified Messaging Integrates Communications", retrieved at <<http://www.microsoft.com/exchange/evaluation/unifiedmessaging/umcommunications.mspx>>, Jan. 23, 2006.
Lopez, Ed, "Ericsson Strives to Provide Unified Messaging Mailbox", retrieved at <<http://www.wirelessweek.com/ericsson-strives-to-provide-unified.aspx?terms=>>, Oct. 4, 1999.
"Sullivan University System", retrieved at <<http://www.microsoft.com.nsatc.net/asia/partnersolutionmarketplace/australia/CaseStudyDetail.aspx?casestudyid=4000000385>>, Jul. 11, 2007.

* cited by examiner

*Primary Examiner* — Ario Etienne
*Assistant Examiner* — Clayton R Williams (57) ABSTRACT

Architecture that employs an abstraction of a mailbox store that allows clients to connect to alternate mailboxes associated with a single mail-enabled user, using the same mechanism the user utilizes to connect to the user's main mailbox. On top of this basic infrastructure, new features can be built, including server-hosted e-mail archives and mailboxes mirrored from other e-mail systems. In support thereof, the architecture also includes a mechanism for mailboxes to expose all or only a subset of mailbox features, and to advertise which mailbox features are supported.

12 Claims, 10 Drawing Sheets

ASSOCIATING MULTIPLE PHYSICAL MAILBOXES WITH SAME USER OBJECT IN MESSAGING SYSTEM

BACKGROUND

Users are becoming connected in more ways than one. For example, cell phones and computers provide the principal means for communicating with other users, and each can be associated with message accounts. Moreover, users are now able to freely create message accounts such as for e-mail and text messaging via websites. Thus, users may have multiple accounts via which to send and receive information. However, having multiple accounts spread across various locations, websites, and clients, for example, introduces new problems with communications technologies that originally facilitate more efficient and effective communications.

Moreover, the capability to store substantially all messages can impose significant burden on client machines, thereby driving a need to store such messages off the client and on servers. However, again, storing different accounts and account messages across different locations is a suboptimal solution to an increasingly mobile society and to system resources.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides an abstraction of a mailbox store that allows clients to connect to multiple "alternate" mailboxes associated with a single user, exposing the same mechanism used to connect to a user's primary (or "main") mailbox. On top of this basic infrastructure, other features can be built such as server-hosted e-mail archives and mailboxes mirrored from other e-mail and PIM data systems. In support thereof, a mechanism is provided for an abstraction layer to expose all or a subset of the alternate mailbox features, and to advertise which alternate mailbox features are supported per alternate mailbox.

Clients can be agnostic to this architecture, by enabling the clients to logon to alternate mailboxes using the same mechanism used to logon to the user's primary mailbox, as though the alternate mailboxes were actually separate mailboxes. The alternate mailboxes can support all or a subset of mailbox features, and a mechanism is provided for the alternate mailboxes to advertise the mailbox features supported.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The need to associate more than one physical store for a mailbox belonging to a user in an e-mail environment can manifest itself in several ways. One such way enables user-accessible archives of e-mail and PIM (personal information management) data to be stored on a server, which were previously stored on the client machine of the end user. An archive is associated with the user's main mailbox account, supports backward compatibility for alternate-mailbox-agnostic clients, and advertises the mailbox features it supports. Another way allows users to mirror content from e-mail and PIM data accounts on other messaging and PIM systems to a centralized, hosted e-mail server. To avoid "bleeding" of personal e-mail data between personal e-mail and work e-mail, a separate mailbox can be provided on the e-mail centralized server for each remote account that is being mirrored. For purposes of backward compatibility, there is a strong desire to provide this functionality with minimal (if any) changes to the clients accessing the e-mail server.

The disclosed architecture provides an abstraction of a mailbox store that allows clients to connect to alternate mailboxes associated with a single mail-enabled user, using the same mechanism the user utilizes to connect to the user's main mailbox. On top of this basic infrastructure, new features can be built, including server-hosted e-mail archives and mailboxes mirrored from other e-mail systems. In support thereof, the architecture also includes a mechanism for mailboxes to expose all or only a subset of mailbox features, and to advertise which mailbox features are supported.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
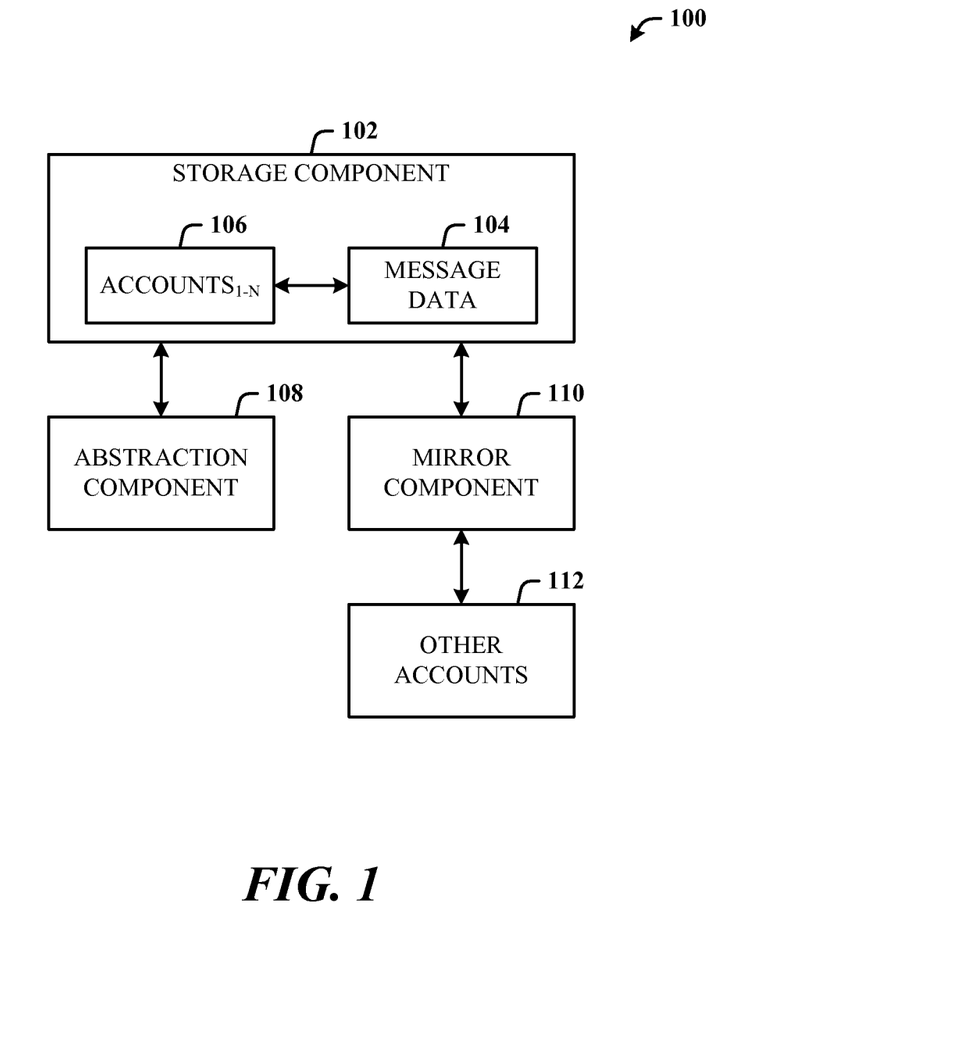
FIG. 1 illustrates a computer-implemented data system in accordance with the disclosed architecture.

FIG. 1 illustrates a computer-implemented data system 100 in accordance with the disclosed architecture. The system 100 includes a storage component 102 centrally located for storing message data 104 associated with multiple accounts 106 of a user, and an abstraction component 108 for providing access to the message data 104 of the multiple accounts 106.

The storage component 102 can be a middle-tier (mid-tier) storage system, for example. The abstraction component 108 provides direct access by the user to one or more of the multiple accounts 106, and facilitates client agnostic access to the message data 104 of the multiple accounts 106. In other words, the client can be one of many different types of clients such as e-mail clients, PIM clients, etc., yet still access the message data 104.

The system 100 can further comprise a mirror component 110 for mirroring the message data 104 from other accounts 112 to the storage component 102. In other words, the other accounts 112 can exist separately at different remote locations relative to the storage component location. The other accounts 112 can include a client-based e-mail account, information associated with a client-based PIM application, server-based messaging account, and so on.

The multiple accounts 106 can include alternate accounts that comprise mirrored accounts of different mailbox accounts associated with correspondingly different e-mail systems, archives of other accounts, and other account types, as desired. For example, one e-mail system can be a web-based account, another e-mail system can be a corporate account, and so on. The mirror component 110 periodically reaches out to each of the other accounts 112 and pulls the associated messaging data into the mirrored accounts in the storage component 102.

Figure 2:
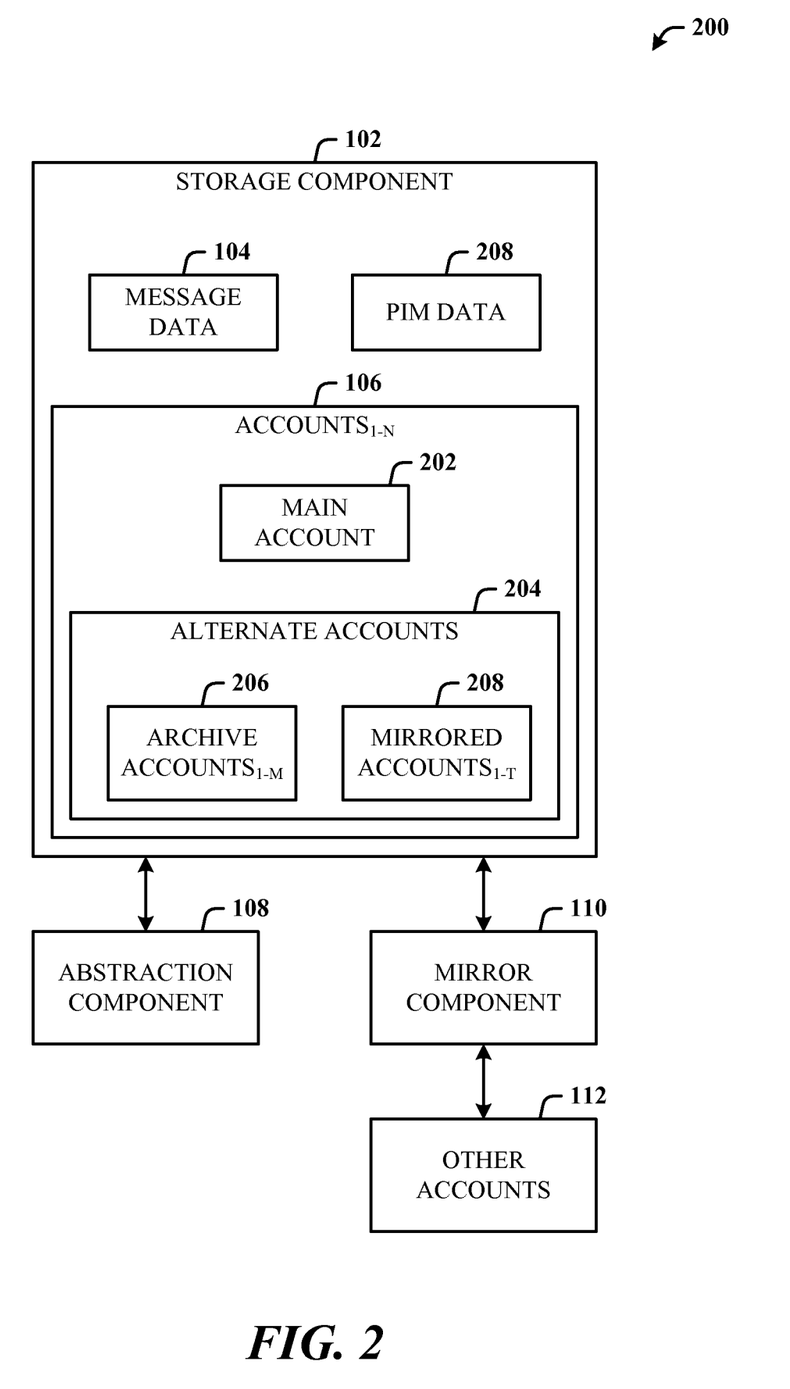
FIG. 2 illustrates an alternative embodiment of a data system.

FIG. 2 illustrates an alternative embodiment of a data system 200. The multiple accounts 106 can include a main mailbox account 202 and alternate mailbox accounts 204. The alternate accounts 204 can include mirrored accounts 206 as well as archive accounts 208 associated with the main account 202. The alternate accounts 204 can include other accounts as well. The abstraction component 108 facilitates access to the alternate accounts 204 via the main mailbox 202. The storage component 102 can also store personal information management (PIM) data 208 associated with the multiple accounts 106 of the user, in addition to the message data 104. Each of the alternate accounts 204 can advertise all or a subset of account features in response to access to the one or more of the alternate accounts 204. Additionally, the storage component 102 can include a user object of the main account 202 that is extended to include a list of associated alternate accounts 204.

Put another way, the computer-implemented data system 200 comprises the storage component 102 centrally located for storing a main mailbox account 202 and alternate mailbox accounts 204 of a user and corresponding e-mail data (e.g., message data 104) and PIM data 208 of the accounts 106, the mirror component 110 for mirroring the e-mail data (the message data 104) and the PIM data 208 of the main mailbox account 202 and other mailbox accounts from other locations (the other accounts 112) to the storage component 102, and the abstraction component 108 for providing access to the alternate mailbox accounts 204 via the main mailbox account 202.

The archive accounts 206 store archives of the e-mail data and PIM data 208 of the main mailbox account 202. In an alternative embodiment, the archive accounts can store archives for the mirrored accounts 208 as well. The alternate mailbox accounts 204 advertise all or a subset of account features that the alternate mailbox accounts 204 support. The account features can be enabled or disabled based on capabilities flags. The alternate mailbox accounts 204 are accessible via the same session interface employed to access the main mailbox account 202.

Figure 3:
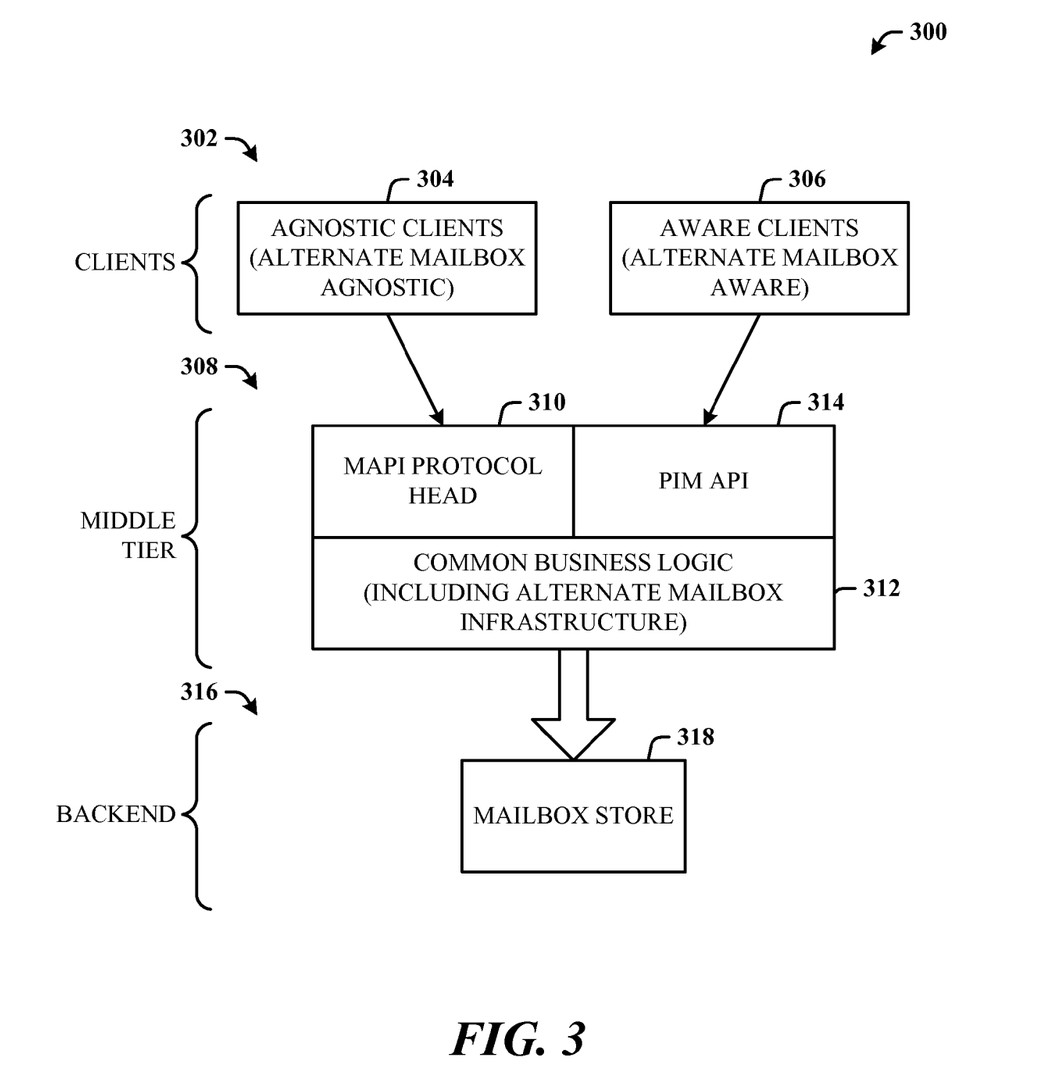
FIG. 3 illustrates an alternate mailbox multi-tier infrastructure for associating multiple mailboxes with a single user.

FIG. 3 illustrates an alternate mailbox multi-tier infrastructure 300 for associating multiple mailboxes with a single user. A client tier 302 includes agnostic clients 304 that are agnostic to the alternate mailboxes, and aware clients 306 that are aware of the alternate mailboxes. The mid-tier 308 includes a MAPI (messaging application programming interface) protocol head 310 for interfacing the agnostic clients 304 to underlying business logic 312 and a PIM API 314 for interfacing the aware clients 306 to the business logic 312. The business logic 312 can also include the alternate mailbox infrastructure. The business logic 312 interfaces to a backend tier 316 that includes a mailbox store 318.

Figure 4:
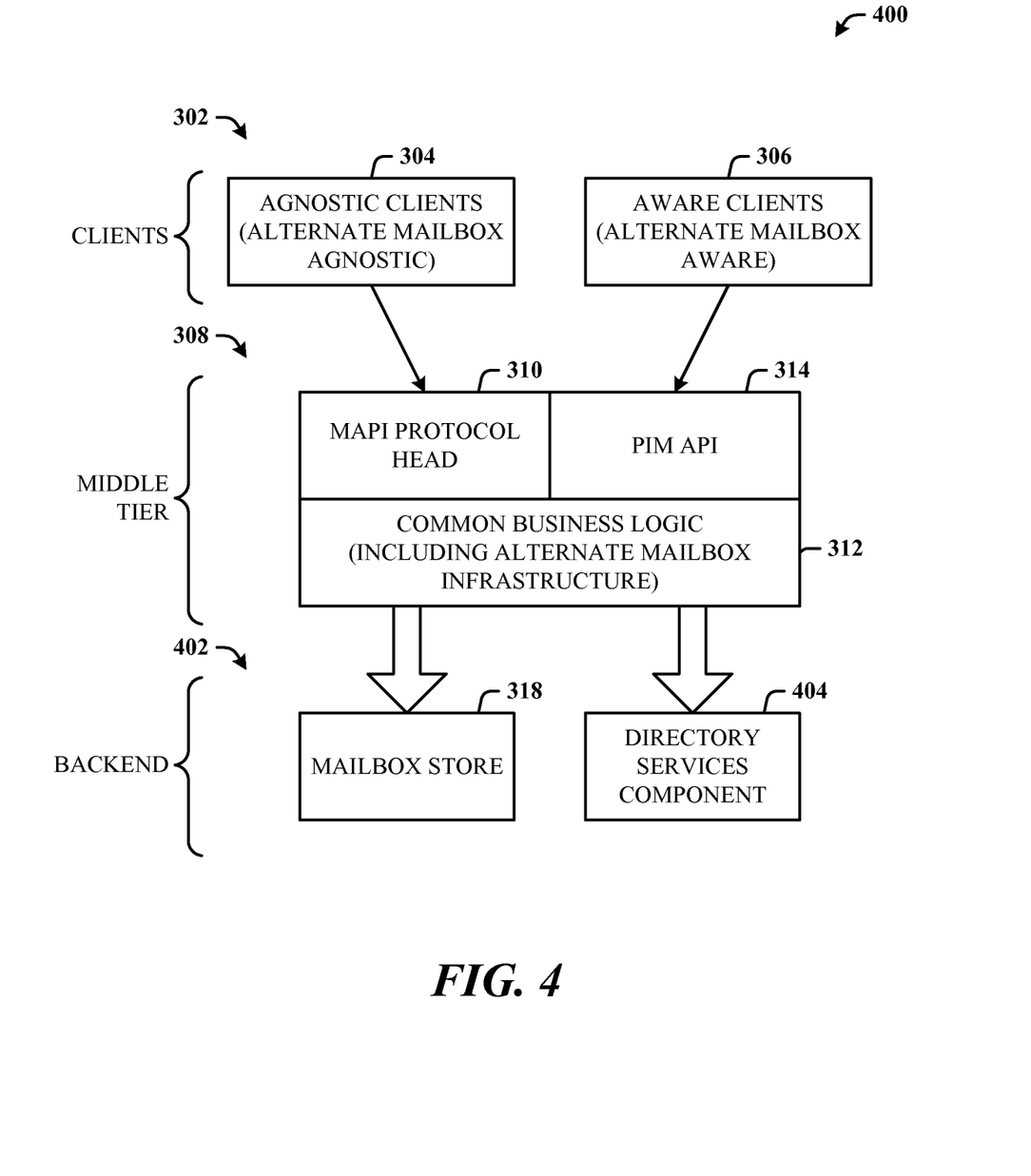
FIG. 4 illustrates an alternate mailbox multi-tier infrastructure for associating multiple mailboxes with a single user that employs directory services.

FIG. 4 illustrates an alternate mailbox multi-tier infrastructure 400 for associating multiple mailboxes with a single user that employs directory services. The client tier 302 includes the agnostic clients 304 that are agnostic to the alternate mailboxes, and the aware clients 306 that are aware of the alternate mailboxes. The mid-tier 308 also includes the MAPI protocol head 310 for interfacing the agnostic clients 304 to the underlying business logic 312 and the PIM API 314 for interfacing the aware clients 306 to the business logic 312. The business logic 312 can also include the alternate mailbox infrastructure. The business logic 312 interfaces to a backend tier 402 that not only includes the mailbox store 318, but also a directory services component 404. The directory services component 404 stores information about network resources such as user accounts, for example.

Because alternate mailboxes are associated with a single main mailbox, the alternate mailboxes do not need the added management burden of being exposed (e.g., in a directory) as a new kind of mailbox-enabled user object, but can instead be represented as an association of attributes on a single user object. The user object can be used to represent a mailbox, and includes attributes such as the mailbox distinguished name and home mailbox database GUID (globally unique identifier). To support alternate mailboxes, the user object can be extended to include a list of the associated alternate mailboxes. The entries encoded in this list include data such as the mailbox GUID, home mailbox database, display name, SMTP address, mailbox quota, and mailbox type (e.g., archive, mirror, etc.).

For example, a user object with a primary mailbox on company.com (user1@company.com) and two alternate mailboxes can have the following data in an alternate mailboxes list:

| ID | HomeMdb | DisplayName | SmtpAddress | Quota | Flags |
| --- | --- | --- | --- | --- | --- |
| {Guid1} | {homeMdbGuid} | Annual Archive | (null) | Unlimited | Archive |
| {Guid2} | {homeMdbGuid} | User 1 Mirrored Mailbox | user1@e-mail.com | 1 GB | Mirror |

To connect to an alternate mailbox, a client uses the same mailbox session API that is used to connect to the main mailbox. This API accepts the distinguished name (DN) or e-mail address of the mailbox to open, recognizes the DN or e-mail address of an alternate mailbox, and finds the DN or e-mail address of the alternate mailbox in the directory.

For clients that are agnostic to the alternate mailbox architecture, a user profile is created (e.g., manually or through a discovery mechanism) that stores this DN. Clients that are alternate mailbox-aware can check the directory at runtime for the set of alternate mailboxes associated with a user, rather than storing the DN. Once the client has connected to the alternate mailbox, the client interacts with the mailbox as it would any other mailbox.

The two scenarios driving alternate mailbox support in mailbox servers (e.g., mailbox archiving and mailbox mirroring) place different requirements on the functionality that the mailbox exposes. For archive mailboxes, certain actions (e.g., send, deliver) and settings (e.g., out-of-office, rules) are only relevant for a user's primary mailbox. Thus, these actions and settings can be disabled for the alternate mailbox. For mirrored mailboxes, however, all mailbox features and settings can be fully enabled on all of this type of alternate mailbox.

To support these two scenarios (and provide expansion to other alternate mailbox types), a mechanism is provided to turn mailbox features on or off, based on a set of "Capabilities" flags. This mechanism also enables the mailbox session to advertise to clients which features the mailbox supports. Alternate mailbox-aware clients can use this data to turn user interface elements on or off, for example, depending on the capabilities of the session.

Following is a sample data format that can be employed to represent session capabilities of a mailbox.

```
[Flags]
internal enum SessionCapabilitiesFlags
{
    None                        = 0x0000,
    CanSend                     = 0x0001,
    CanDeliver                  = 0x0002,
    CanCreateDefaultFolders     = 0x0004,
    MustHideDefaultFolders      = 0x0008,
    CanHaveDelegateUsers        = 0x0010,
    CanHaveExternalUsers        = 0x0020,
    CanHaveRules                = 0x0040,
    CanHaveJunkE-mailRule       = 0x0080,
    CanHaveMasterCategoryList   = 0x0100,
    CanHaveOof                  = 0x0200,
    CanHaveUserConfigurationManager = 0x0400,
    MustCreateFolderHierarchy   = 0x0800,
    Default = CanSend | CanDeliver |
        CanCreateDefaultFolders |
        CanHaveDelegateUsers | CanHaveExternalUsers |
        CanHaveRules | CanHaveJunkE-mailRule |
        CanHaveMasterCategoryList | CanHaveOof |
        CanHaveUserConfigurationManager
}
```

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 5:
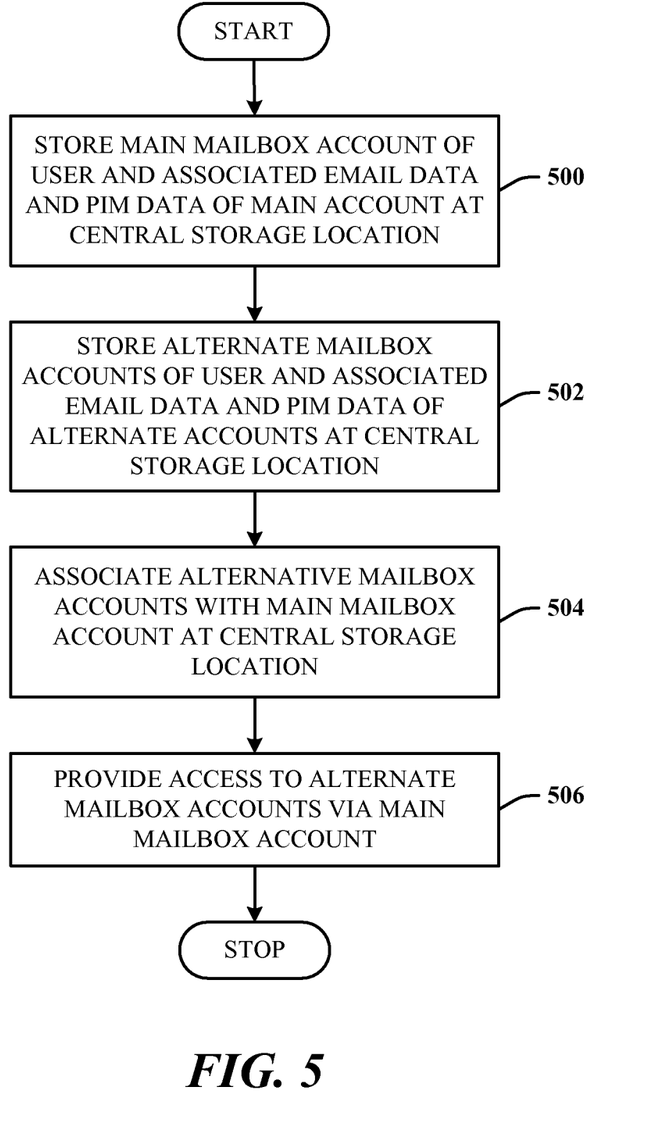
FIG. 5 illustrates a method of managing data.

FIG. 5 illustrates a method of managing data. At 500, a main mailbox account of a user and associated e-mail data and PIM data of the main account are stored at a central storage location. At 502, alternate mailbox accounts of the user and associated e-mail data and PIM data of the alternate accounts are stored at the central storage location. At 504, the alternate mailbox accounts are associated with the main mailbox account at the central storage location. At 506, access to the alternate mailbox accounts is provided via the main mailbox account.

Figure 6:
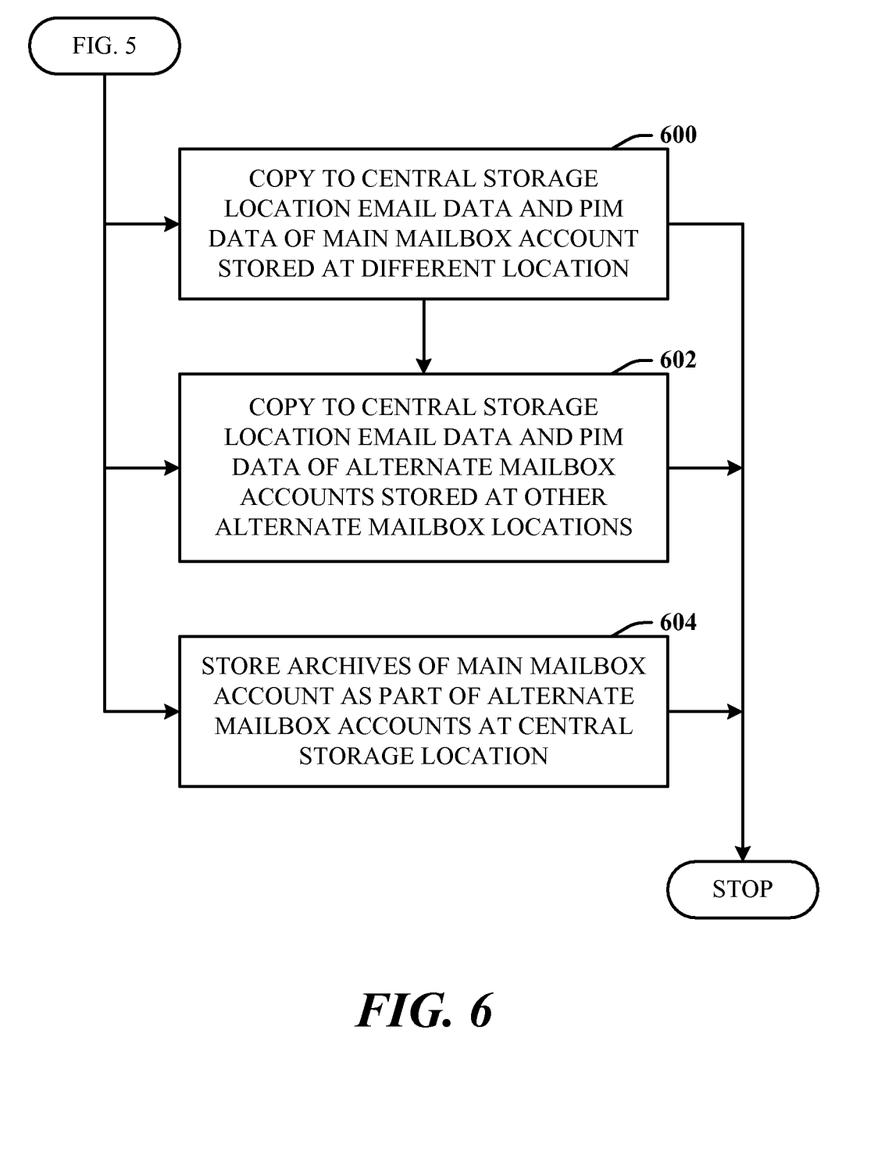
FIG. 6 illustrates additional aspects of the method of FIG. 5.

FIG. 6 illustrates additional aspects of the method of FIG. 5. At 600, the e-mail data and PIM data of the main mailbox account stored at a different location can be copied to the central storage location. At 602, the e-mail data and PIM data of the alternate mailbox accounts stored at other alternate mailbox locations can be copied to the central storage location. At 604, archives of the main mailbox account are stored as part of the alternate mailbox accounts at the central storage location.

Figure 7:
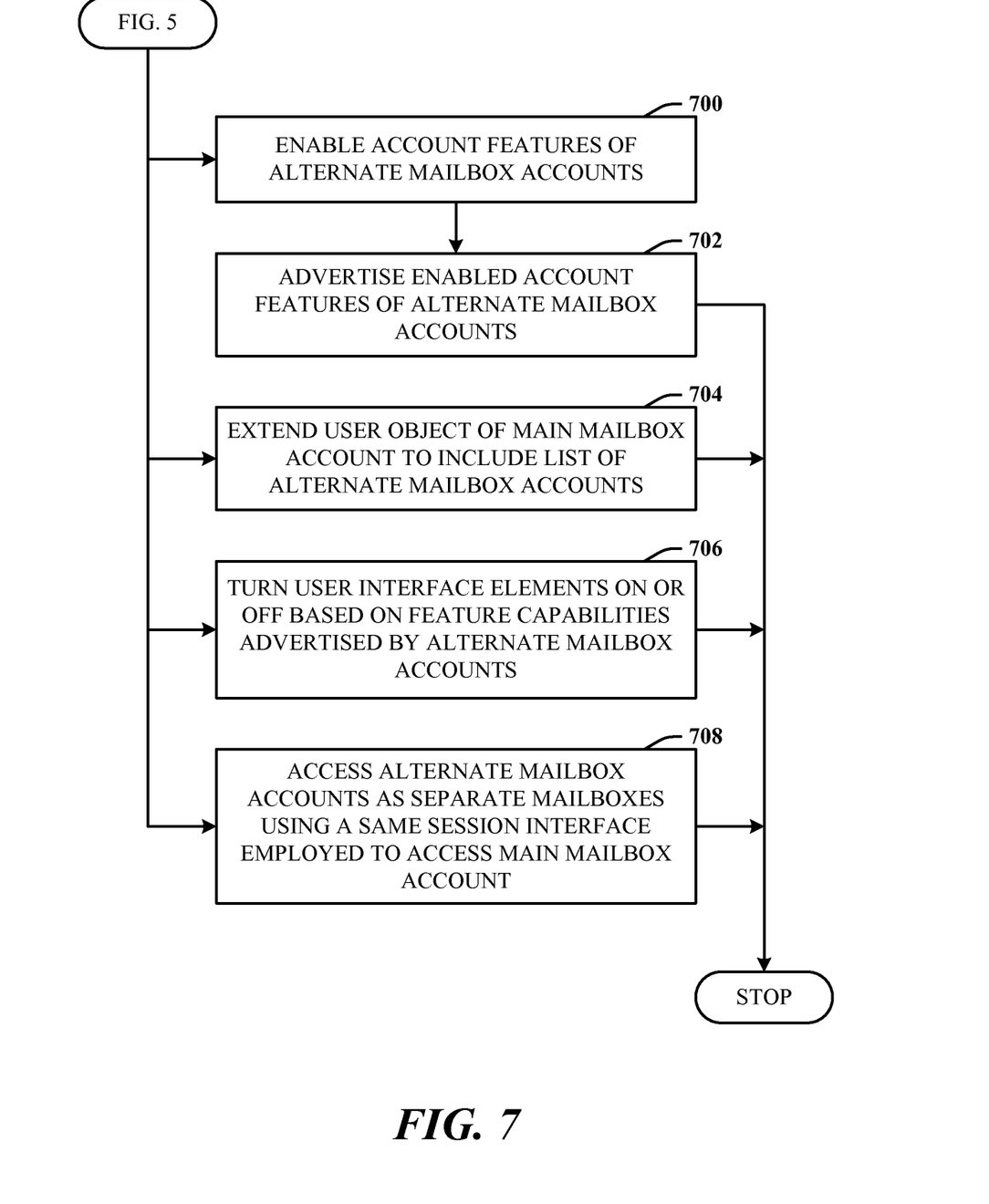
FIG. 7 illustrates yet additional aspects of the method of FIG. 5.

FIG. 7 illustrates yet additional aspects of the method of FIG. 5. At 700, account features of the alternate mailbox accounts are enabled. At 702, the enabled account features of the alternate mailbox accounts are advertised. At 704, a user object of the mail mailbox account is extended to include a list of the alternate mailbox accounts. At 706, user interface elements are turned on or off based on feature capabilities advertised by the alternate mailbox accounts. At 708, the alternate mailbox accounts are accessed as separate mailboxes using the same session interface employed to access the main mailbox account.

Figure 8:
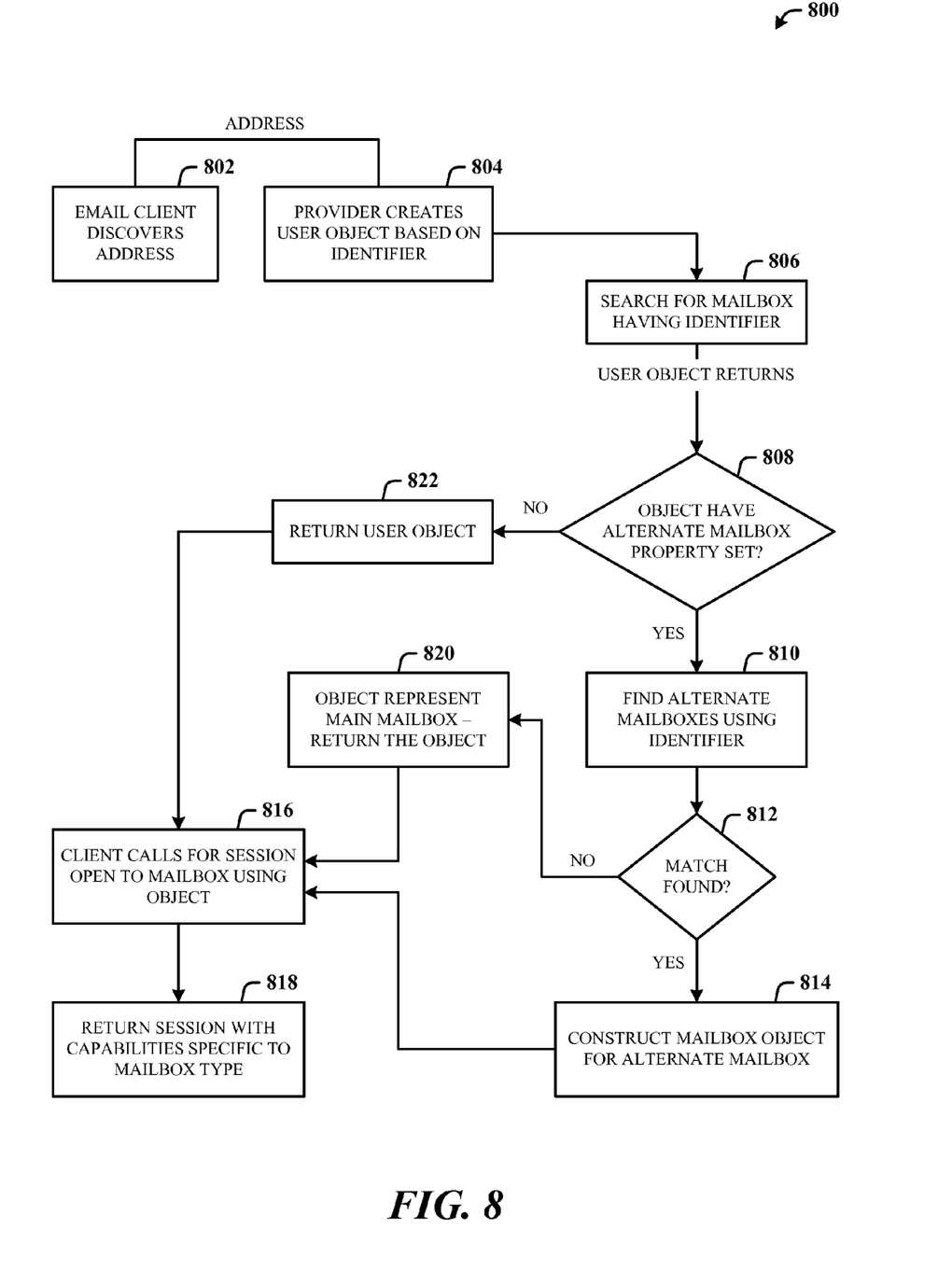
FIG. 8 illustrates a detailed flow in the middle-tier of managing data of multiple mailbox accounts at a central location.

FIG. 8 illustrates a detailed flow 800 in the middle-tier of managing data of multiple mailbox accounts at a central location. The flow diagram describes flow from when a client is connecting to an alternate mailbox and the middle-tier logic, and finding the correct mailbox to connect to. At 802, an e-mail client automatically discovers the address (e.g., HTTP). However, the client has an identifier of a mailbox to which to connect, and attempts to connect to the mailbox based on the identifier. At 804, a mid-tier provider creates a user object that represents the mailbox based on the identifier of the client. At 806, a search is made in the storage for a mailbox having the identifier. At 808, if the mailbox exists, flow is to 810 to find the alternate mailboxes associated with the main mailbox. At 812, if a match is found, flow is to 814 to construct another representation of a mailbox object for that alternate mailbox. Flow is then to 816 where the client calls for a session to open for the mailbox (in this case, an alternate mailbox). At 818, the session is returned back to the client with capabilities specific to the mailbox. At 812, if a match is not found, flow is to 820, where the client is looking at the main mailbox and the object is returned to 816. If, at 808, there the object does not have the alternate mailbox property set, flow is to 822 to return the user object to 816.

In this case, the client can be the MAPI protocol head 310 of FIG. 3. The client can discover the alternate mailboxes via the main mailbox. In one alternative implementation, the client can discover the mirrored mailboxes directly without going through the main mailbox.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
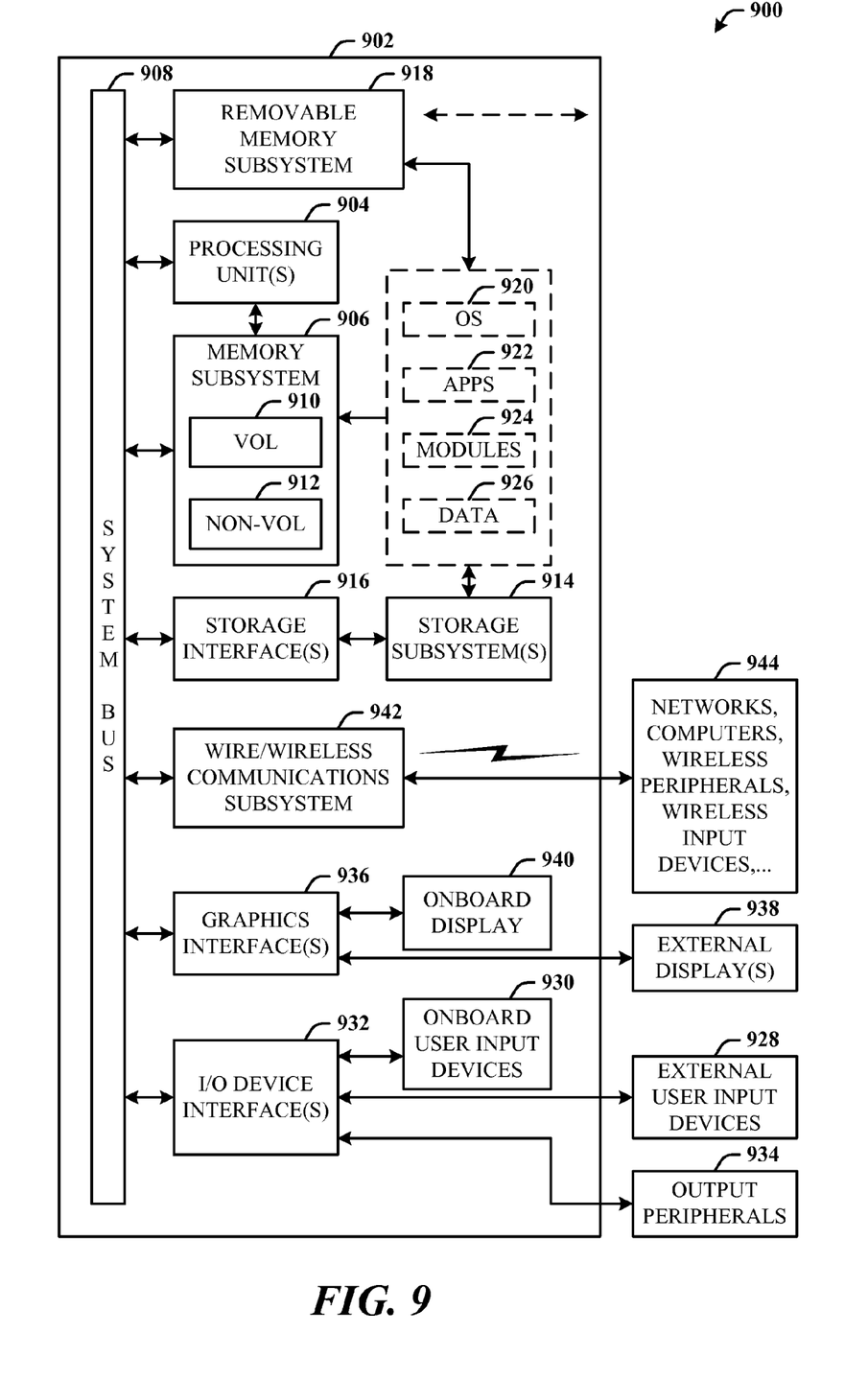
FIG. 9 illustrates a block diagram of a computing system operable to support the disclosed alternate mailbox infrastructure in accordance with the disclosed architecture.

Referring now to FIG. 9, there is illustrated a block diagram of a computing system 900 operable to support the disclosed alternate mailbox infrastructure in accordance with the disclosed architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914, including an operating system 920, one or more application programs 922, other program modules 924, and program data 926. Generally, programs include routines, methods, data structures, other software components, etc., that perform particular tasks or implement particular abstract data types.

The one or more application programs 922, other program modules 924, and program data 926 can include the components and entities of the system 100 of FIG. 1, the components and entities of the system 200 of FIG. 2, the components and entities of the infrastructure 300 of FIG. 3 and infrastructure 400 of FIG. 4, and the flow charts and diagrams of FIGS. 5-8, for example.

All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wired/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 10:
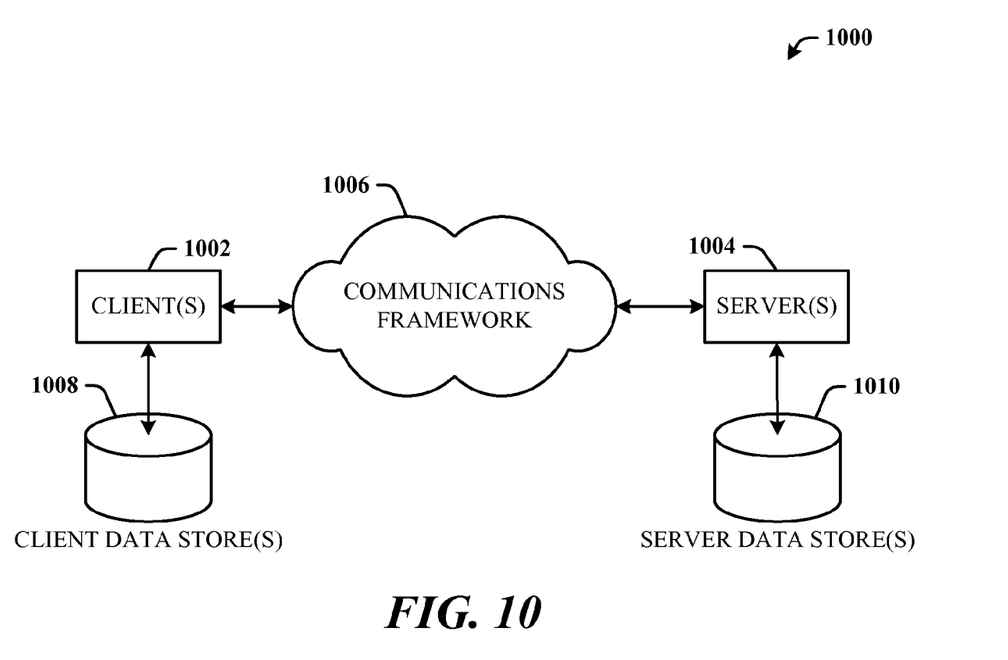
FIG. 10 illustrates a schematic block diagram of a computing environment that supports mid-tier alternate mailboxes.

Referring now to FIG. 10, there is illustrated a schematic block diagram of a computing environment 1000 that supports mid-tier alternate mailboxes. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004. The server(s) 1004 can include the mid-tier functionality, entities, and components as described herein, as well as the backend stores and network services.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data system, comprising:
   a processor;
   a storage component, coupled to the processor, and centrally located for storing multiple accounts of a user and message data associated with the multiple accounts, the multiple accounts comprising:
   a main account and one or more alternate mailbox accounts, the one or more alternate mailbox accounts advertising all or a subset of mailbox account features that the one or more alternate mailbox accounts support to one or more alternate-mailbox aware clients, the advertised mailbox account features useable by the one or more alternate-mailbox aware clients to enable or disable the mailbox account features at the alternate-mailbox aware client, the advertising comprising providing a data structure comprising a set of capabilities flags corresponding to the mailbox account features,
   the storage component comprising a user object of the main account that is extended to include a list of alternate accounts associated with the main account, the list of alternate accounts comprising Simple Mail Transfer Protocol (SMTP) addresses of the alternate accounts; and
   an abstraction component, executing on the processor, for providing access to the message data of the multiple accounts, the abstraction component facilitating access to alternate mailboxes of the one or more alternate mailbox accounts via a main mailbox of the main account.

2. The system of claim 1, wherein the abstraction component provides direct access by the user to one or more of the multiple accounts.

3. The system of claim 1, wherein the storage component stores personal information management (PIM) data associated with the multiple accounts of the user.

4. The system of claim 1, wherein the storage component stores the message data and PIM data associated with archive accounts and the multiple accounts.

5. The system of claim 1, further comprising a mirror component for mirroring the message data and PIM data from other accounts to the multiple accounts of the storage component.

6. The system of claim 1, wherein the abstraction component facilitates client agnostic access to the message data of the multiple accounts.

7. A computer-implemented data system, comprising:
   a processor;
   a storage component, coupled to the processor, and centrally located for storing a main mailbox account and one or more alternate mailbox accounts of a user, and corresponding e-mail data and PIM data of the main mailbox account and the one or more alternate mailbox accounts, the one or more alternate mailbox accounts advertising all or a subset of mailbox account features that the one or more alternate mailbox accounts support to one or more alternate-mailbox aware clients, the advertised mailbox account features useable by the one or more alternate-mailbox aware clients to enable or disable the mailbox account features at the alternate-mailbox aware client, the advertising comprising providing a data structure comprising a set of capabilities flags corresponding to the mailbox account features, the storage component comprising a user object of the main mailbox account that is extended to include a list of alternate mailbox accounts associated with the main mailbox account, the list of alternate mailbox accounts comprising Simple Mail Transfer Protocol (SMTP) addresses of the alternate mailbox accounts;
   a mirror component, executing on the processor, for mirroring the e-mail data and the PIM data of the main mailbox account and other mailbox accounts from other locations to the storage component; and
   an abstraction component, executing on the processor, for providing access to the one or more alternate mailbox accounts via the main mailbox account, wherein the one or more alternate mailbox accounts are accessible via a same session interface employed to access the main mailbox account.

8. The system of claim 7, wherein the storage component stores archives of the e-mail data and PIM data of the main mailbox account, and mirrored accounts of the other mailbox accounts as part of the one or more alternate mailbox accounts.

9. A computer-implemented method of managing data, comprising:
   storing a main mailbox account of a user and associated e-mail data and PIM data of the main mailbox account at a central storage location;
   storing one or more alternate mailbox accounts of the user and associated e-mail data and PIM data of the one or more alternate mailbox accounts at the central storage location, the one or more alternate mailbox accounts advertising all or a subset of mailbox account features that the one or more alternate mailbox accounts support to one or more alternate-mailbox aware clients, the advertised mailbox account features useable by the one or more alternate-mailbox aware clients to enable or disable the mailbox account features at the alternate-mailbox aware client, the advertising comprising providing a data structure comprising a set of capabilities flags corresponding to the mailbox account features;
   associating the one or more alternate mailbox accounts with the main mailbox account at the central storage location by extending a user object of the main mailbox account to include a list of alternate mailbox accounts associated with the main mailbox account, the list of alternate mailbox accounts comprising Simple Mail Transfer Protocol (SMTP) addresses of the alternate mailbox accounts;
   providing access to the one or more alternate mailbox accounts via the main mailbox account; and
   accessing the one or more alternate mailbox accounts as separate mailboxes using a same session interface employed to access the main mailbox account.

10. The method of claim 9, further comprising:
    copying to the central storage location e-mail data and PIM data of the main mailbox account stored at a different location; and
    copying to the central storage location e-mail data and PIM data of the one or more alternate mailbox accounts stored at other alternate mailbox locations.

11. The method of claim 9, further comprising storing archives of the main mailbox account as part of the one or more alternate mailbox accounts at the central storage location.

12. The method of claim 9, further comprising turning user interface elements on or off based on feature capabilities advertised by the one or more alternate mailbox accounts.

* * * * *